United States Patent [19]

Tabeling et al.

[11] Patent Number: 5,361,206
[45] Date of Patent: Nov. 1, 1994

[54] METHOD OF ANALYZING A TWO-PHASE FLOW IN A HYDROCARBON WELL

[75] Inventors: Patrick J. R. Tabeling, L'Hay les Roses, France; Bernard E. Theron, Sevres, both of

[73] Assignee: Schlumberger Technology Corporation, New York, N.Y.

[21] Appl. No.: 892,901

[22] Filed: Jun. 3, 1992

[30] Foreign Application Priority Data

Jun. 18, 1991 [FR] France ................ 91 07454

[51] Int. Cl.$^5$ ............................................. G01V 3/18
[52] U.S. Cl. ................................................ 364/422
[58] Field of Search ........................... 364/420–422

[56] References Cited

U.S. PATENT DOCUMENTS 3,792,347 2/1974 Hawley .
4,314,476 2/1982 Johnson .
4,974,446 12/1990 Vigneaux .

FOREIGN PATENT DOCUMENTS 0362011 9/1989 European Pat. Off. .
0394085 4/1990 France .
2118723A 3/1983 United Kingdom .

OTHER PUBLICATIONS

"Oil/Water Flow Structure Measurements in Inclined Pipes", SPE article 18217, 2–5 Oct. 1988 by P. Vigneaux et al.

*Primary Examiner*—Gail O. Hayes
*Attorney, Agent, or Firm*—Leonard W. Pojunas

[57] ABSTRACT

A method of analyzing the flow in an inclined well, which flow comprises both oil and water is described. For a depth at which at least one flow parameter measurement is available, and given the inclination and the diameter of the well at that depth, the measured value is used to establish a profile for the variation of the flow parameter. The profile of the flow parameter is established along an axis defined by the diameter of the well cross-section that lies in a vertical plane using a model that assumes a layer comprising a turbulent mixture of water and oil.

19 Claims, 7 Drawing Sheets

TYPE IV

TYPE I

TYPE II

TYPE III

METHOD OF ANALYZING A TWO-PHASE FLOW IN A HYDROCARBON WELL

FIELD OF THE INVENTION

In general terms the invention relates to analyzing water-and-oil two-phase flows in hydrocarbon wells. More particularly, the invention relates to a method of using measurements performed at given depths to determine a parameter such as water holdup, and a curve showing how said parameter varies across the cross-section of the well at the depth under consideration. The invention also relates to determining the oil flow rate on the basis of such profiles.

BACKGROUND OF THE INVENTION

It is commonplace in hydrocarbon production for the fluid produced by a well to be a mixture of two phases: oil and water. As a general rule the water constitutes the continuous phase while the oil constitutes the dispersed phase which is in the form of bubbles.

Conventional techniques for analyzing flows in hydrocarbon wells are based on measuring the total flow rate $Q_t$ and the water holdup $H_w$ (i.e. the mean static fraction of the water). It is conventional to use a spinner flowmeter that responds to velocity for measuring the total flow rate $Q_t$, and use a differential pressure apparatus responsive to density and called a pressure gradiometer for measuring the water holdup $H_w$. The oil flow rate $Q_o$ is determined from these measurements by the conventional formula:

$$Q_o = (1 - H_w)(Q_t + V_S \cdot H_w \cdot S)$$

where $V_S$ is the slip velocity between the phases and $S$ is the cross-sectional area of the well.

The above formula assumes that the values of velocity and holdup that result from the above-mentioned measurements, which are mean values over the flow section, are indeed representative of the flow. In other words, the variations in velocity and water holdup across the section of the well are negligible, or in any event have a negligible overall influence on the result.

That assumption is justified for a well that is vertical. However, for an inclined well the difference in density between the phases tends to cause them to separate: water which is the heavier phase predominates in the lower part of the flow section whereas oil which is lighter predominates in the upper part of the section. Under certain conditions, the phases separate completely, i.e. the lower part of the flow section is occupied solely by water while the upper part is occupied solely by oil (reference may be made on this topic to the Society of Petroleum Engineers (SPE) article #18217 entitled "Oil/water Flow Structure Measurements in Inclined Pipes", 2-5 Oct. 1988, by P. Vigneaux, G. Catala, and J. P. Hulin). In this type of situation, backflow is observed in the bottom of the flow section.

Naturally, under such conditions, given that the variations in water holdup and in velocity across the flow section are large, the results obtained by the abovementioned measurements do not provide a reliable estimate of the looked-for mean values.

SUMMARY OF THE INVENTION

The present invention provides a method of analyzing the flow in an inclined well, which flow comprises both oil and water. According to the method, for a depth where at least one flow parameter measurement is available, the measured value is used to establish a profile for the variation of said parameter along an axis z'z defined by the diameter of the well cross-section that lies in a vertical plane, by using a model that assumes a layer comprising a turbulent mixture of water and oil.

The variation profile obtained using the invention constitutes precious information for interpreting the flow parameter measurements. It may be established on the basis of a plurality of local measurements such as those described in U.S. Pat. No. 4,974,446 or in European patent application No. EP-A-0394085, in which case it enables a mean value to be determined by integration over the flow section.

In the opposite direction, the variation profile may also be established on the basis of a mean value obtained by means of a conventional type of measurement such as that described above.

The invention will be well understood on reading the following description made with reference to the accompanying drawings.

DESCRIPTION OF THE PREFERRED EMBODIMENTS

Figure 1:
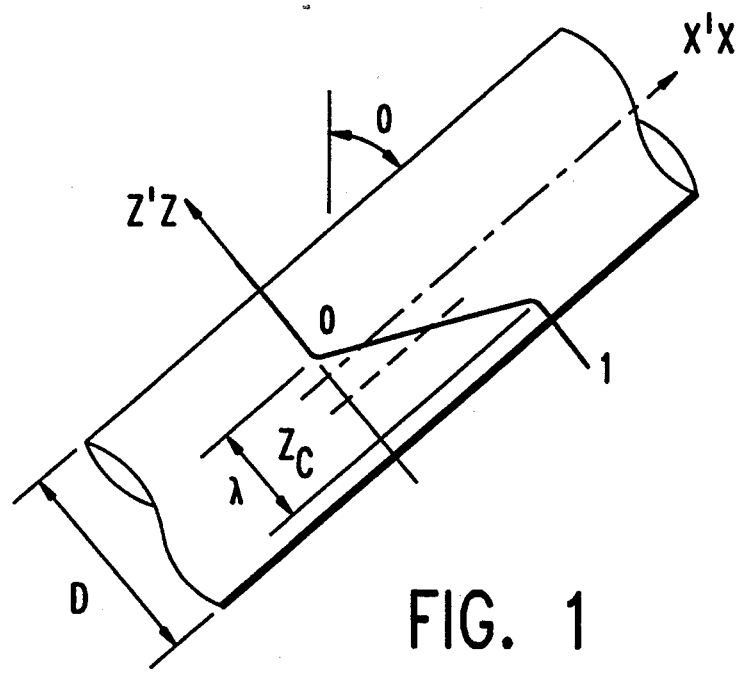
FIG. 1 represents a model of flow as used in the invention.

FIG. 1 shows a portion of an oil-producing well of diameter D. A fluid flows along this well towards the surface, which fluid comprises a mixture of underground water and oil. It is assumed below that the fluid is a two-phase fluid and that the gas which is present is in solution in the fluid. The most common case is that oil constitutes the dispersed phase and water constitutes the continuous phase, and it is this situation that is described below, but it should be understood that the invention is not limited thereto in any way. The specific gravities of the two phases are different, being about 0.8 for the oil, and between 1 and 1.1 for the water which is generally brine. As a result the phases tend to segregate: oil tends to predominate in the top of the flow section and water tends to predominate in the bottom of the section.

FIG. 1 shows the model used by the invention for studying the flow. A coordinate system is defined with an axis x'x lying on the axis of the well, and axes y'y (not shown) and z'z situated in a plane perpendicular to the axis x'x, with the axis z'z lying in a vertical plane. The axis x'x is inclined relative to the vertical at an angle $\theta$. The model assumes that there exists a turbulent layer of water-oil mixture which, when projected on the axis z'z, extends over a length written $\lambda$. In FIG. 1, the heavy line constitutes a profile showing how water holdup $\alpha$ varies along the axis z'z. In the example shown, the water holdup is equal to 1 at the bottom of the section and 0 at the top, and it varies with constant gradient in the layer of mixing. The profile shown in FIG. 1 corresponds to a simple model completely defined by the dimension $\lambda$ and by the position $z_c$ of the center of the layer of mixing. The water holdup $\alpha$ is then given by:

$$\alpha = 1 \text{ for } z < z_c - \tfrac{1}{2}\lambda \tag{1a}$$

$$\alpha = \tfrac{1}{2} + (z_c - z)/\lambda \text{ for } z_c - \tfrac{1}{2}\lambda < z < z_c + \tfrac{1}{2}\lambda \tag{1b}$$

$$\alpha = 0 \text{ for } z > z_c + \tfrac{1}{2}\lambda \tag{1c}$$

If the mean water holdup $\alpha$ on the axis z'z is written $a_m$, then the above expression (1b) becomes:

$$\alpha = a_m - z/\lambda \tag{2}$$

The example of FIG. 1 shows a layer of mixing that is fully contained within the flow section. However, the model provides for various different situations depending on the values of $\lambda$ and $z_c$, as shown in FIGS. 2A-2D.

Figure 2A:
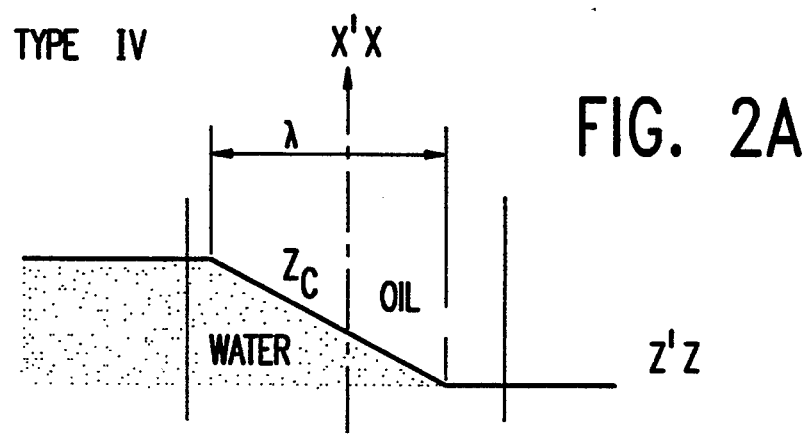
FIGS. 2A to 2D show different types of profile for variation in water holdup $\alpha$, as applicable to the model.

FIG. 2A shows a profile of the same type as that in FIG. 1, i.e. a profile in which the layer of mixing is fully contained within the flow section. The fluid in the bottom of the section is water only, and the only fluid present in the top of the section is the oil phase. This corresponds to $\lambda$ being smaller than the diameter D, and to the position of $z_c$ being close to the axis x'x.

Figure 2B:
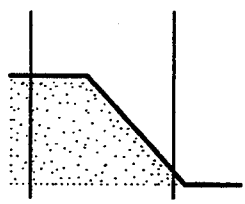

FIG. 2B shows a profile where the bottom edge of the layer of mixing lies within the flow section, but the top edge lies outside it. In this case, the bottom of the section has the water phase only, but the fluid occupying the top of the section is a mixture of the phases having a small water fraction. This corresponds to $\lambda$ being smaller than the diameter D, and to the position $z_c$ being positive and considerably offset from the axis x'x.

Figure 2C:
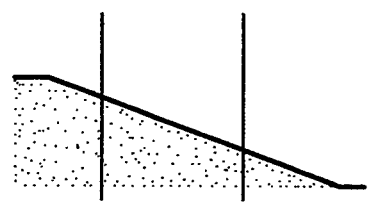

FIG. 2C corresponds to the dimension $\lambda$ of the layer of mixing being greater than the diameter of the section. The entire section is occupied by a mixture of the water and oil phases.

Figure 2D:
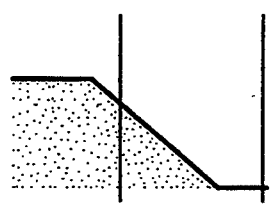

FIG. 2D shows a profile analogous to that of FIG. 2B, but offset in the opposite direction. The dimension $\lambda$ is smaller than the diameter D and the position $z_c$ is negative and offset considerably from the axis x'x. The top of the flow section contains oil only, whereas the bottom of the section is occupied by a mixture having a large water fraction.

By using dimensional analysis and ignoring viscosity, the following relationship can be obtained for the dimension $\lambda$:

$$\lambda = D/(k \cdot \sin \theta) \tag{3}$$

where k is a constant for a given diameter (equal to 1.06 for D=20 cm and 1.4 for D=10 cm).

To establish the variation profile $\alpha(z)$, it is also necessary to determine the parameter $z_c$ or, equivalently, the mean value $a_m$ of the water holdup over the axis z'z. This is done by adjusting the parameter $z_c$ or $a_m$ so as to make the values calculated using the model coincide with the values as measured. To do this, use is made of measurements of the water holdup $\alpha$ at a given depth, which measurements may either be one or more measurements of the local value of $\alpha$, or else a measurement of the mean value of $\alpha$ over the flow section.

Given its simplicity, the above-described geometrical model gives a reasonable match with the available experimental data as set forth in the above-mentioned article by Vigneaux et al. A more accurate model has been established using an approach based on the laws of turbulent diffusion.

An element of a mixture of thickness dz and of density $\rho(z)$ is the result of two opposite flows. One of these flows is due to buoyancy and is related to the difference in densities whereby the lighter oil phase tends to rise. The other flow is due to turbulent diffusion which tends to make the mixture uniform.

This is expressed by the equation:

$$K(\partial \alpha / \partial z) + s(1 - \alpha) = 0 \tag{4}$$

where K is a turbulent diffusion coefficient and s is the settling speed. Assuming that s is constant, the following expression is obtained:

$$\alpha(z) = 1 - C \cdot e^{sz/K} \tag{5}$$

It is advantageous to express $\alpha(z)$ as a function of the mean value $a_m$ of $\alpha(z)$ on the z'z axis. For a profile of the type shown in FIG. 2C, where the top edge of the turbulent layer lies outside the duct, there is no value of z in the range $-\tfrac{1}{2}D$ and $+\tfrac{1}{2}D$ for which $\alpha = 0$. By integrating over the integral $\{-\tfrac{1}{2}D, +\tfrac{1}{2}D\}$, the following is obtained:

$$\alpha(Z) = 1 - \frac{P(1 - a_m)}{shP} e^{2PZ} \tag{6}$$

where $Z = z/D$ (a dimensionless magnitude) and $$P = sD/2K$$

By comparing the gradient calculated from expression (6) with the constant gradient of the first model, the following expression is obtained for P:

$$P = (k \cdot \sin \theta)/(2(1 - a_m)) \tag{7}$$

where k has the same value as in the first model, which gives:

$$\alpha(z) = 1 - \frac{k \cdot \sin \theta}{2shP} e^{2PZ} \tag{8}$$

Expression (6) was obtained by assuming that $\alpha(z) > 0$ over the entire profile. For a profile of the type shown in FIG. 2D, the water holdup becomes zero beyond a certain point. This corresponds to the existence of a value $z_e$ which satisfies the following conditions simultaneously:

$$\begin{cases} \alpha(Z_e) = 0 \\ Z_e < \tfrac{1}{2}D \end{cases}$$

The profile α(z) then comprises a portion of a curve over the range $\{-\tfrac{1}{2}D, z_e\}$ and a portion to which α=0 over a range $\{z_e, +\tfrac{1}{2}D\}$. Although expression (6) theoretically corresponds to a different situation, i.e., $z_e > \tfrac{1}{2}D$, it has been observed that it nevertheless provides an approximation for that portion of the profile α(z) in the range $\{-\tfrac{1}{2}D, z_e\}$ that is satisfactory.

Thus, in general terms, the profile can be defined as follows:

$$\alpha(z) = 1 - \frac{k \cdot \sin\theta}{2shP} e^{2PZ} \text{ for } z < \min\{Z_e, \tfrac{1}{2}D\}$$

and solely for $z_e < \tfrac{1}{2}D$:

$$\alpha(Z)=0 \text{ for } z_e < z < \tfrac{1}{2}D$$

where $\min\{z_e, \tfrac{1}{2}D\}$ means the smaller of the values $z_e$ and $\tfrac{1}{2}D$.

The profile α(z) is established by determining the value of the parameter P (or $\alpha_m$) by adjusting the model as a function of measurements of the water holdup α.

Figure 3:
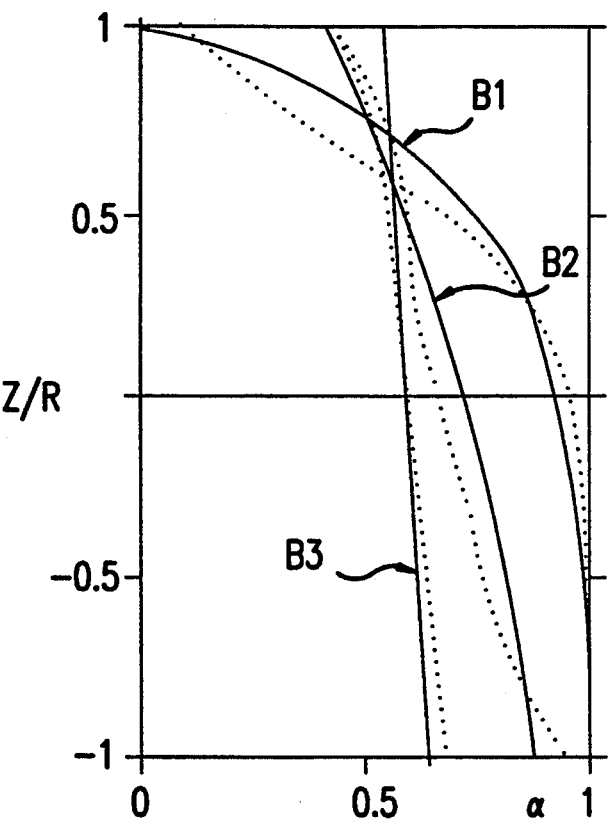
FIGS. 3 and 4 are graphs showing how experimental values comply with the values predicted by the second above-mentioned model.
Figure 4:
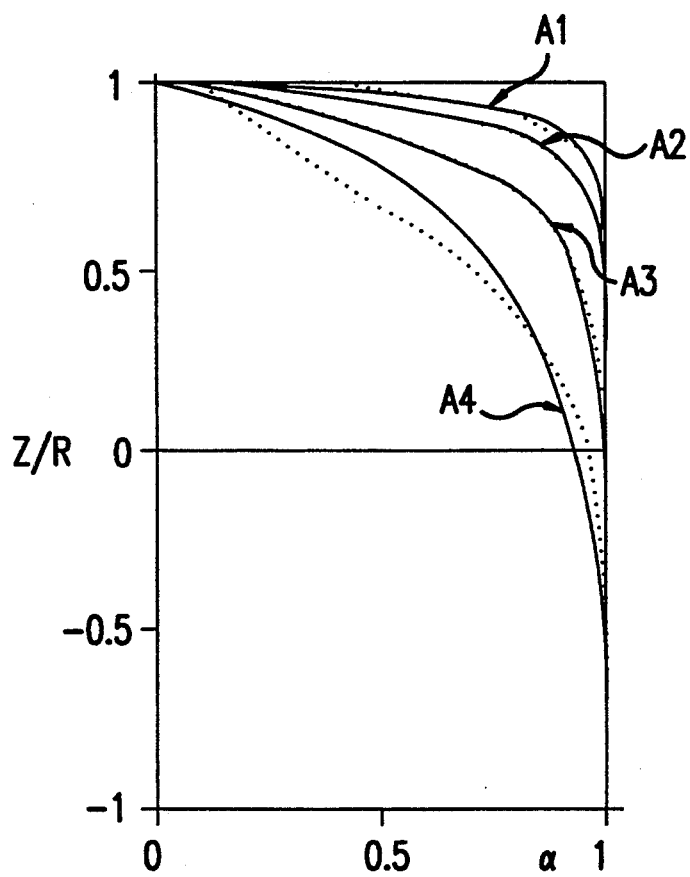

FIGS. 3 and 4 show the good agreement between this model (solid line curves) and experimental values (dotted lines) obtained in an installation having a tiltable duct. The conditions were as follows. In FIG. 4, the inclination θ is 65°, the diameter D is 200 mm, and the total flow rate is 2000 barrels per day (13.2 m³/h). The four curves marked A1, A2, A3, and A4 correspond respectively to water cuts of 95%, 90%, 70%, and 30%. The parameter plotted along the X-axis is the water holdup α and the parameter plotted up the Y-axis is the ratio z/R (where R is the radius of the duct). In FIG. 3, the water cut is fixed at 50% and the curves correspond to different values of inclination θ: 65° for curve B1, 25° for curve B2, and 5° for curve B3.

As mentioned above concerning the constant gradient model, the profile may be established either by using local measurements of α, or else by measuring the mean value over the flow section. The calculation steps required when using local measurements are shown in the flow chart of FIG. 5, and, alternatively, the steps when using the mean value are shown by the flow chart of FIG. 6.

The instrument described in U.S. Pat. No. 4,974,446 or European patent application EP-A-0394085 has N small-sized microwave probe tips angularly distributed around a circle centered on the axis of the instrument which is of diameter $D_t$, with the angular position of a sonde relative to an origin based on the axis z'z being written $\beta_i$ (i=1,N). The instrument may be constrained to remain centered relative to the well, or else it may be designed to bear against the bottom portion of the wall of the well. Means are associated with the instrument to measure the inclination θ of the well and the angular positions $\delta_i$. The diameter D of the well is assumed to be known, or else to have been measured by means of an inside caliper.

The values of D and θ, and also the constant k which is known for a given diameter D are provided in step 51 of the chart. Step 52 concerns inputting measurement data provided by the above-described instrument, namely the diameter $D_t$, the local measurement of the water holdup $\alpha_i$, and the respective angular positions $\delta_i$ of the sondes. Step 53 provides the coordinate $z_i$ along the axis z'z for each of the sondes i as a function of the diameter $D_t$ and of the angular position $\alpha_i$. This calculation naturally depends on the way in which the instrument is placed relative to the well (centered or pressed downwards). At step 54, an initial value is determined for the parameter $\alpha_m$, by taking a mean of the measurements $\alpha_i$. At step 55 the least-squares method is used to calculate the value of $\alpha_m$ which corresponds to an optimum fit with the set of values α(zi) calculated as described above on the measured values $\alpha_i$.

This result $\alpha_m$ is the mean of the water holdup α over the axis z'z. A profile α(z) is deduced therefrom, on the basis of which (step 56) it is possible to calculate the mean water holdup $H_w$ by integrating the profile α(z) over the circular flow section A, using the expression:

$$H_w = -\int_{-\tfrac{1}{2}D}^{+\tfrac{1}{2}D} \alpha(z) \cdot (D^2 - 4z^2)^{\tfrac{1}{2}} \cdot dz \qquad (9)$$

Graphical representations of the profile α(z) and of the mean water holdup $H_w$ can be obtained at the output.

Figure 6:
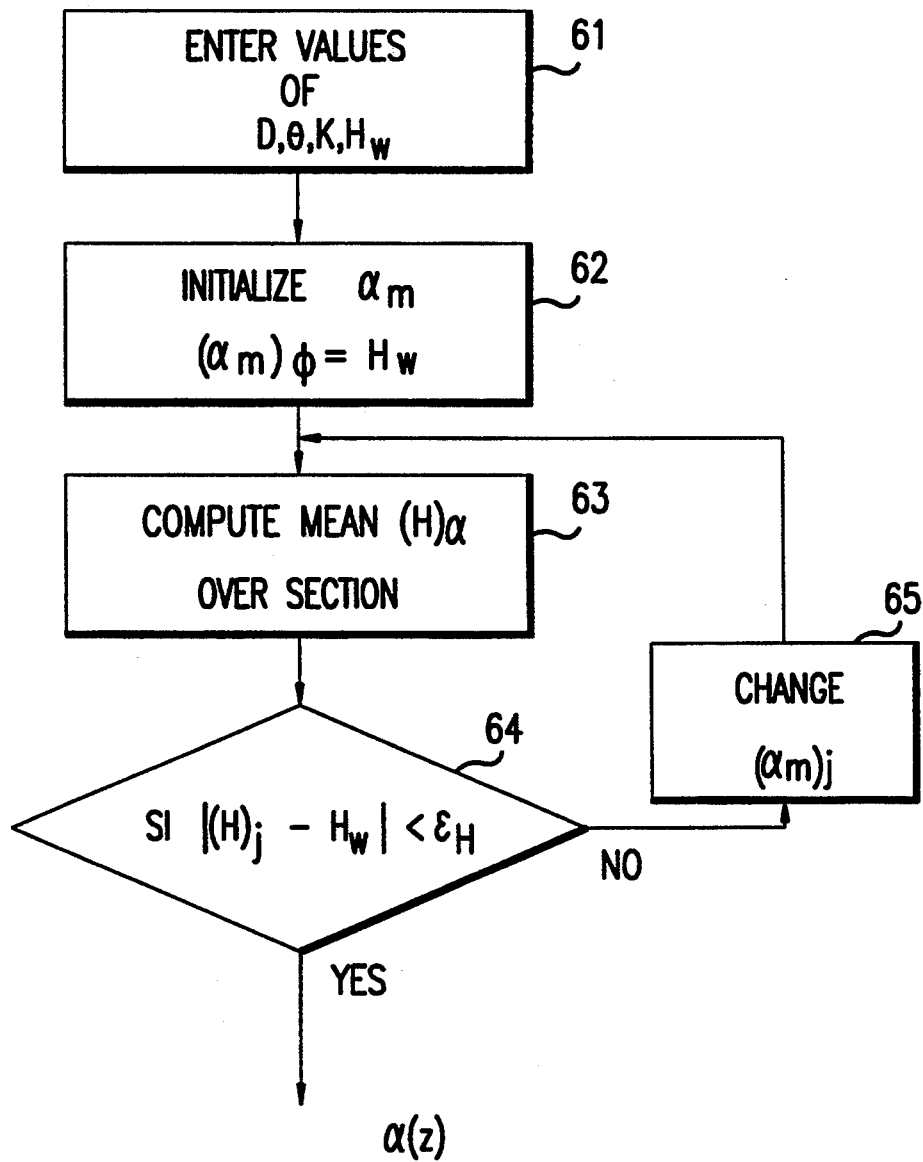
FIG. 6 is a flow chart showing how a profile of variation in $\alpha$ is established from a measurement of the mean water holdup $H_w$.

The flow chart of FIG. 6 shows the processing steps that enable a profile α(z) to be established on the basis of the mean water holdup $H_w$. In an initial step 61 the values of the diameter D, of the angle of inclination θ, of the constant k, and of $H_w$ are provided as obtained by measurement. In step 62, an initial value $(\alpha_m)1$ is fixed for $\alpha_m$, which value may be taken as being equal to $H_w$. Step 63 consists in calculating a mean value $(H)_j$ taken over a flow section that is circular in shape. This calculation is performed using expression (9). The value $(H)_j$ is compared with $H_w$ at step 64. If the difference is not less than a predetermined quantity εH then the calculation is started again with a value $(\alpha_m)j+1$ for a different $\alpha_m$, and this is continued until the difference between the result of step 63 and $H_w$ is less than quantity εH. The corresponding value of am is then used for establishing the profile α(z).

Figure 7:
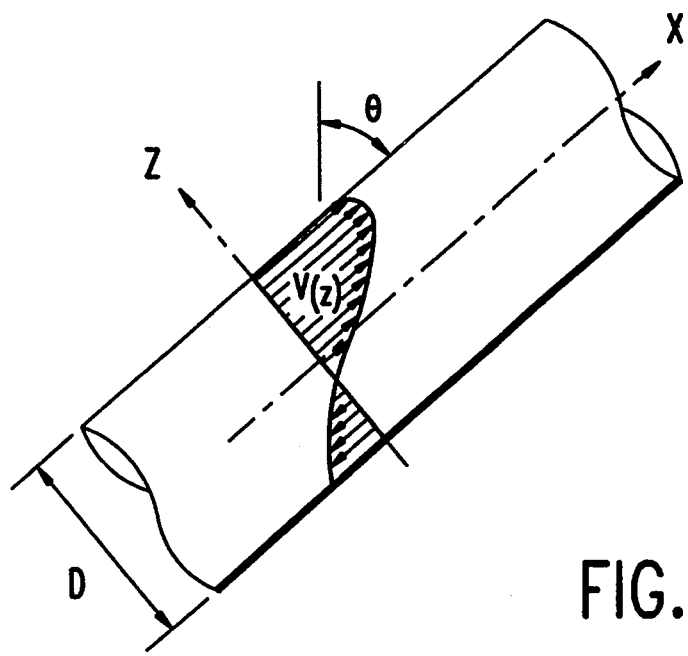
FIG. 7 is a diagram of a flow section showing variation in velocity.

FIG. 7 shows a velocity profile v(z), which illustrates how velocity v varies along the axis z'z (i.e. the axis perpendicular to the axis of the well x'x and lying in a vertical plane). The velocity v accounts for the entire flow, i.e. of both phases. It is the velocity of the mixture:

$$v = \alpha \cdot v_w + (1-\alpha) \cdot v_o$$

where $v_w$ and $v_o$ are respectively the velocities of the water and of the oil phases. The profile of FIG. 7 includes a negative portion towards the bottom of the section. This corresponds to a downward flow in the fluid occupying the bottom portion of the section, whereas the fluid occupying the top of the section flows towards the surface (positive portion of the profile).

From a theoretical point of view, the velocity profile v(z) is the solution to the Navier-Stokes equation for the case where the density gradient ρ(z) is given by:

$$\rho(z) = \rho_w \alpha(z) + \rho_o(1-\alpha(z)) \qquad (10)$$

where $\rho_w$ and $\rho_o$ are the relative densities respectively of the water and of the oil produced in the well.

By making simplifying assumptions concerning a profile α(z) corresponding to above expression (1b), by assuming constant turbulent velocity, and by assuming for end conditions that the velocity in the vicinity of the walls satisfies a logarithmic profile, the following expression is obtained:

$$v(z_1) = -6V_m(Z^2 - \tfrac{1}{4}) + X \cdot D(\sin\theta \cdot \cos\theta)^{\tfrac{1}{2}} \cdot \quad (11)$$

$$Z - (2\beta/D)\sin^2\theta \cdot Z(Z^2 - \tfrac{1}{4})$$

where:

$V_m$ is the mean velocity on the axis z'z
$Z = z/D$
X is a constant equal to about $5 \cdot s^{-1}$
$\beta$ is a constant equal to about $0.7\ m^2\ s^{-1}$ In this case, P (see expression (7)) is relatively large, from 1 to 50 or more, for example. P is a function of the hold-up model and a relatively large P value indicates non-uniform and large gradients of flow.

The velocity profile v(z) may be established on the basis of a measurement of the mean value of the velocity over the flow section as provided by a spinner flowmeter, or else on the basis of local measurements of bubble velocities or else on the basis of the "superficial" velocity of the dispersed phase as obtained in accordance with the teaching of U.S. Pat. No. 4,974,446 (where "superficial" velocity is defined as volume flow rate per unit area).

Figure 8:
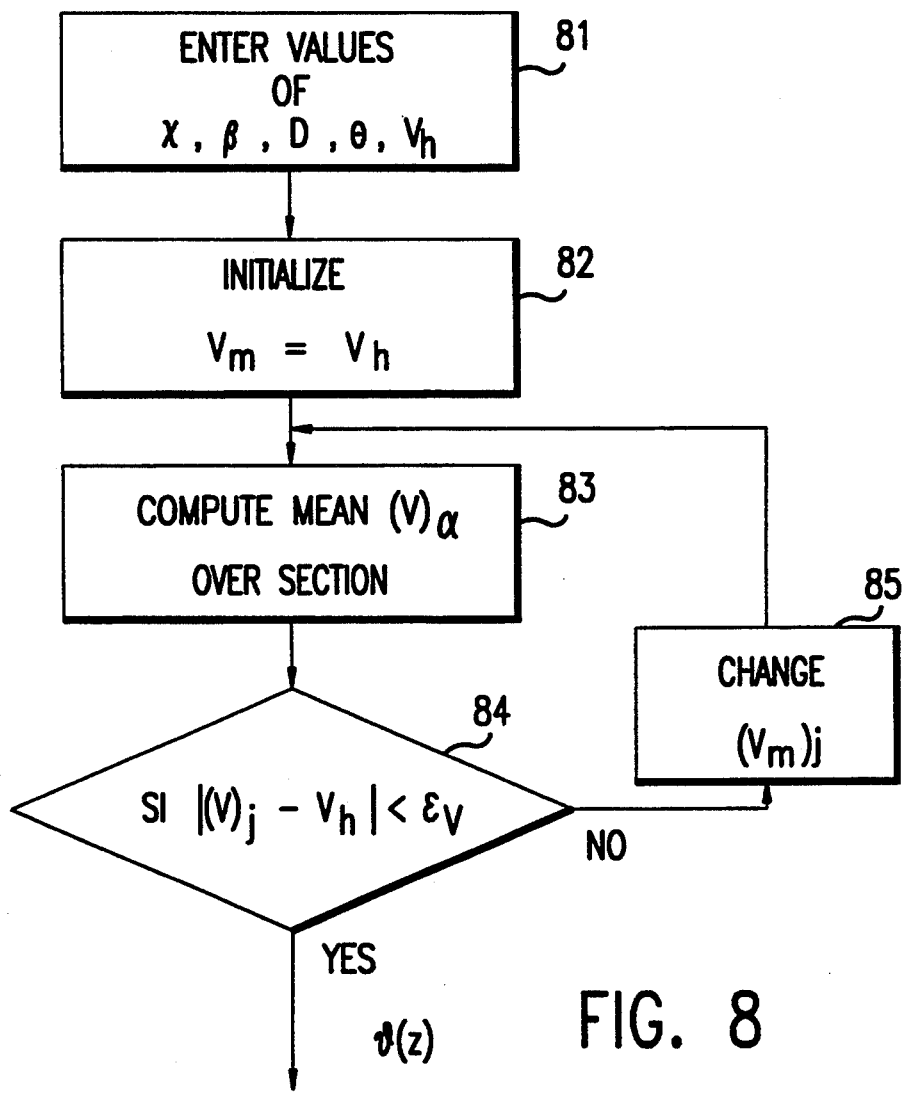
FIG. 8 is a flow chart showing how a velocity profile is established on the basis of a measurement of the mean value of velocity.
Figure 9:
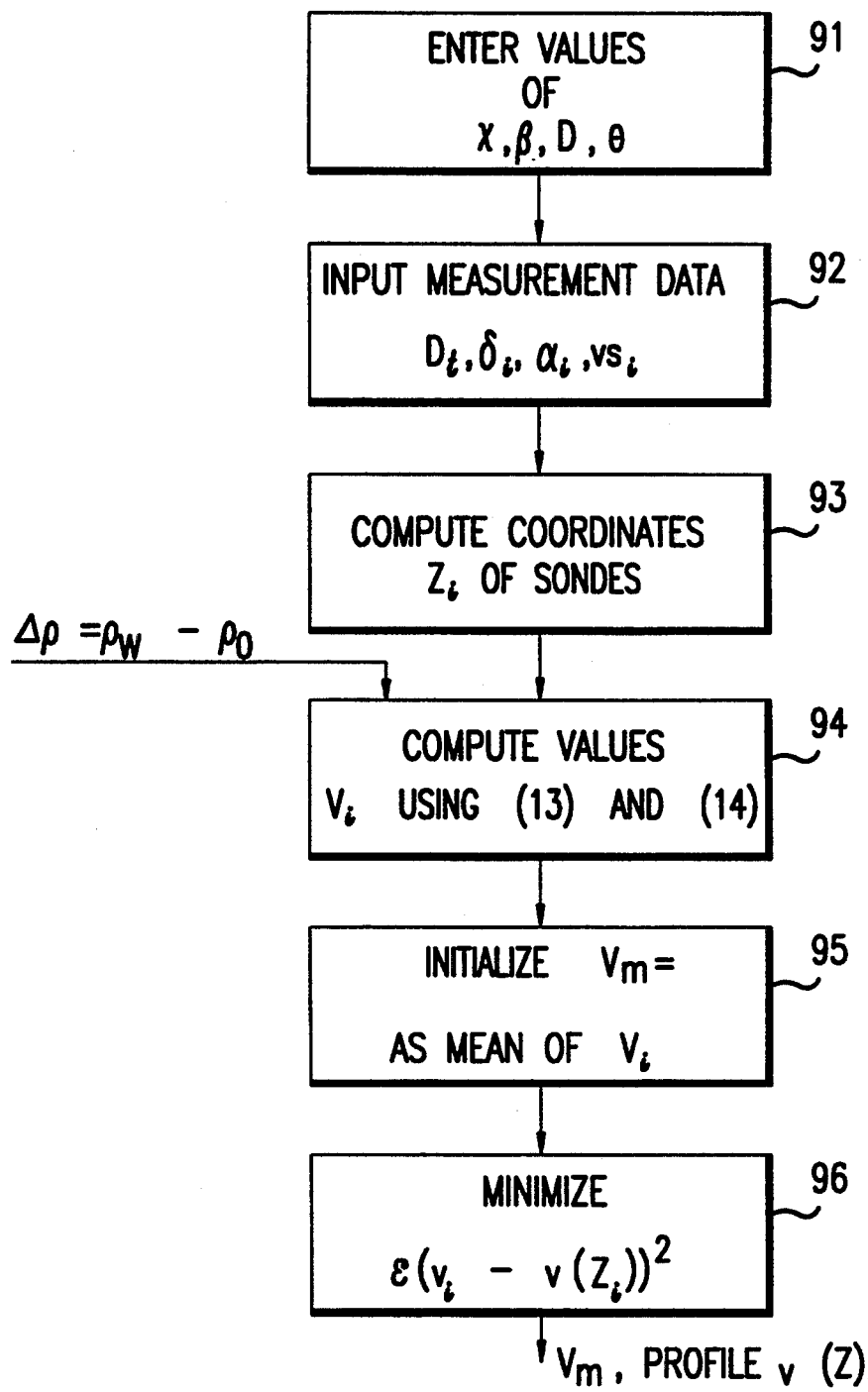
FIG. 9 is a flow chart showing how a profile of velocity and of oil flow rate are established on the basis of local velocity measurements.

The corresponding processing is shown in the flow charts of FIGS. 8 and 9 respectively. Processing the mean velocity includes an initial step 81 to assign values for the parameters D and $\theta$ (diameter and inclination of the well), for the constants $\beta$ and X, and for the mean velocity V (equal to the ratio of the total flow rate $Q_t$ divided by the area A) as measured at the depth under consideration. The following iterative calculation serves to fit the magnitude $V_m$, i.e. the mean of the velocity v(z) over the axis z'z to make the corresponding mean velocity over the flow section coincide with the measured value. Step 82 consists in fixing an initial value $(V_m)_1$ for $V_m$, and is chosen to be equal to the measured value V.

In step 83, the mean velocity value over the flow section of diameter D is calculated using equation:

$$(V_h)_1 = \int_{-\tfrac{1}{2}D}^{+\tfrac{1}{2}D} v(z)\{V_m = v\} \cdot (D^2 - 4z^2)^{\tfrac{1}{2}} \cdot dz \quad (12)$$

in which the notation $v(z)\{V_m=V\}$ means that the value V is given to the parameter $V_m$ that appears in the expression for v(z).

The value $(V)_j$ is compared with the measured value V in step 84. If the difference is greater than a small determined quantity $\epsilon V$, then the iteration is continued, changing the value given to $V_m$ (step 85), and this is repeated until the difference is less than the quantity $\epsilon V$, whereupon the corresponding value $(V_m)_k$ is retained as the value of $V_m$, and the velocity profile v(z) is established.

The flow chart of FIG. 9 shows the steps in the calculation for establishing the velocity profile on the basis of local measurements.

The local measurements obtained in accordance with the teaching of U.S. Pat. No. 4,974,446 by means of an instrument fitted with N microwave sondes makes it possible to obtain for each sonde i (i=1, N) the local water holdup $\alpha_i$ and the local superficial velocity $vs_i$ of the dispersed phase. These magnitudes are related to the local velocity $v_i$ by the equation:

$$(1-\alpha_i) \gg v_i = vs_i - \alpha_i(1-\alpha_i) \cdot (v_s)_i \quad (13)$$

where $(v_s)_i$ is the local slip velocity between the phases.

According to Choquette's model, the local slip velocity is given by the equation:

$$v_s = V_{lim} \cdot e^{-c(1-\alpha)} \quad (14)$$

where: c is a constant and $V_{lim}$ is of the form $f(\rho w - \rho o) \cdot (\cos\theta)^{\tfrac{1}{2}}$.

The initial step 91 provides the values of the constants X and $\beta$ as mentioned concerning equation (11), and the values of the parameters D (well diameter) and $\theta$ (inclination). Step 92 consists in inputting the following data: the diameter $D_t$ of the circle on which the sondes are placed, and the angular position $\delta_i$ for each sonde i, the corresponding water holdup $\alpha_i$, and the superficial velocity $vs_i$.

Figure 5:
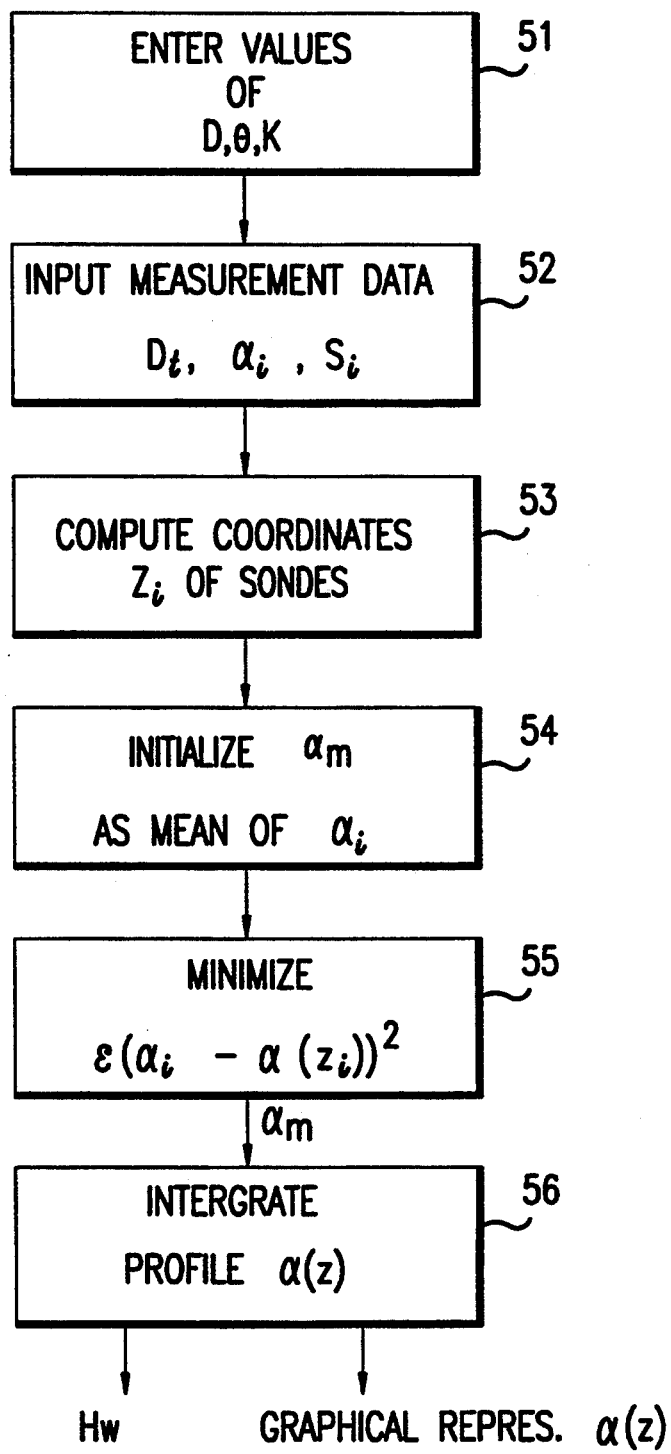
FIG. 5 is a flow chart describing how a profile for variation in $\alpha$ is established on the basis of local measurements of that parameter.

Step 93 is identical to step 53 described with reference to FIG. 5, and it provides the coordinates $z_i$ of the sondes on the axis z'z. Step 94 consists in calculating the local velocity $v_i$ on the basis of the measured values, using equations (13) and (14). Step 95 consists in calculating the local velocities $v(z_i)$ on the basis of the model corresponding to expression (11), for the values $z_i$ obtained at step 93. The initial value for $V_m$ is selected to be the mean of the local velocities $v_i$ obtained at step 94. Step 96 consists in using the least-squares method to obtain the value of $V_m$ which gives the best fit to the set of values $v(z_i)$ calculated using the model on the values $v_i$ obtained by measurement. Once this value has been obtained, the velocity profile v(z) can be established.

The total flow rates of oil $Q_o$ and of water $Q_w$ can be evaluated on the basis of the profiles $\alpha(z)$ and v(z) by integrating the respective local flow rates $q_o$ and $q_w$ over the flow section A, where $q_o$ and $q_w$ are given by the expressions:

$$q_o = (1-\alpha) \cdot v + \alpha(1-\alpha) \cdot v_s$$

$$q_w = \alpha \cdot v - \alpha(1-\alpha) \cdot v_s$$

The corresponding velocities $V_o$ for the oil and $V_W$ for the water can be calculated on the basis of the flow rates $Q_o$ and $Q_w$:

$$V_o = Q_o / (A(1 - H_w))$$

and $$V_w = Q_w / (A \cdot H_w)$$

Given the mean velocities, it is then possible to determine a mean slip velocity Vs as follows:

$$V_s = V_o - V_w$$

Figure 10:
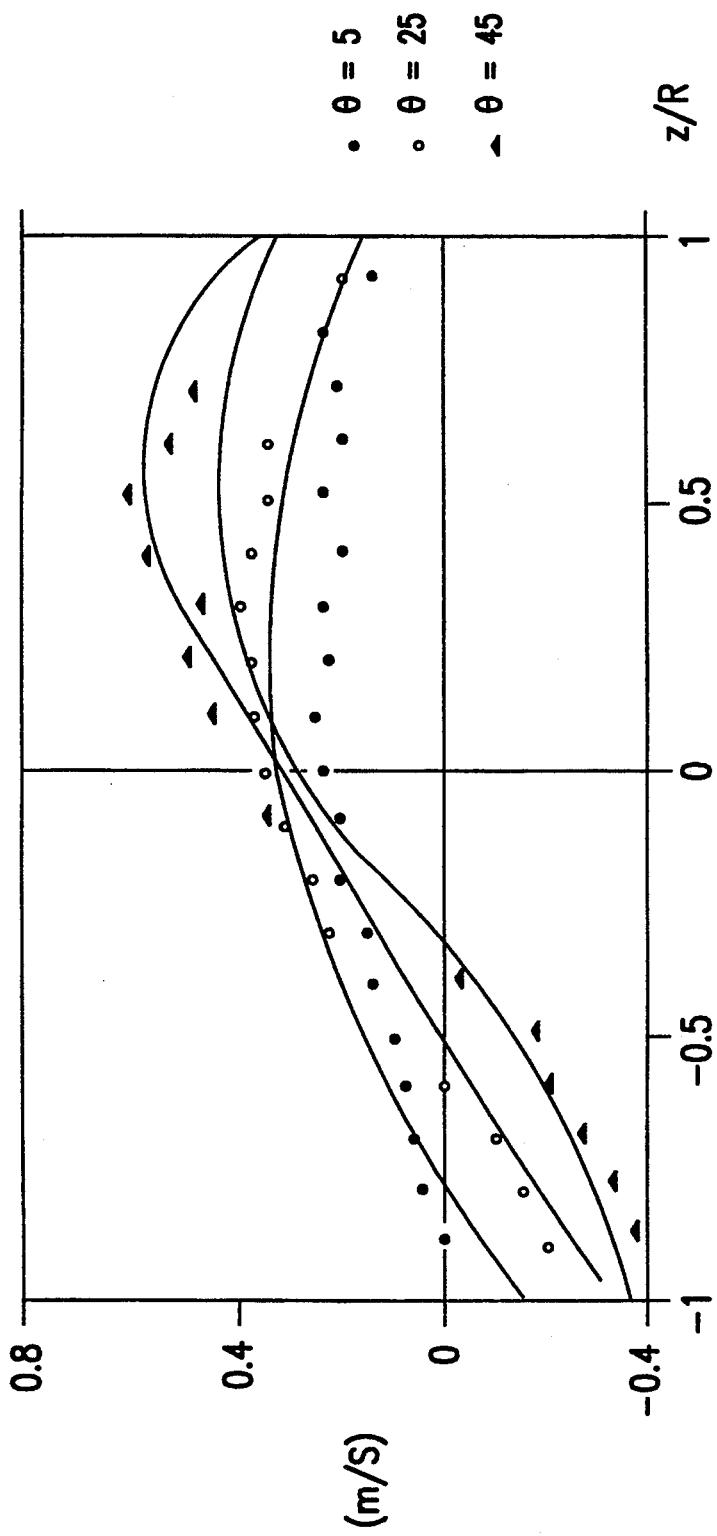
FIG. 10 is a graph comparing velocity values predicted by the model with velocity values obtained experimentally.

FIG. 10 shows a comparison between measured velocity profiles and profiles predicted by the above-described model. The profiles shown correspond to the following conditions: total flow 4000 barrels per day (26.5 m³/h), and the following inclinations $\theta$: 5°-25°, and 45°. It can be seen that satisfactory agreement is obtained between the experimental values and the results obtained from the model.

In addition to the velocity model for large P (expression (11)), the inventors have developed a velocity model for small P<1. In this case, flow gradients are small and uniform. The model is:

$$v(z_2) = V_m + 6V^*_2(z^2 - 1/12) + 2V^*_2 z - 2V^*_2 e^{2P(Z-\tfrac{1}{2})} \quad 15$$

where $V^*_2$ is 0.3 m/s, a constant.

From the specific models of expressions 11 and 15, the inventors have developed a general velocity model:

$$v(z_3) = e^{-P/10} V(z_1) + (1 - e^{-P/10}) v(z_2) \quad\quad 16$$

For large P, expression 16 reduces to expression 15. For small P, expression 16 reduces to expression 11.

It is to be understood that while the devices described throughout the specification are preferred embodiments of the invention, various alternatives, modifications, and equivalents may be used. Therefore, the above description should not be taken as limiting the invention which is defined by the appended claims.

We claim:

1. A method of analyzing the flow in an inclined well, which flow comprises both oil and water, comprising the steps of:
   a) measuring at least one parameter of the flow at a location in the well so as to determine a value representative thereof;
   b) determining values of a depth z, an inclination $\theta$, and diameter D of the well at said location;
   c) establishing a profile for variation of said parameter along an axis defined by a diameter of the well cross-section at said location which lies in a vertical plane, by using a model that assumes a layer comprising a turbulent mixture of water and oil and values of z, $\theta$ and D; and
   d) using the profile to analyze the flow.

2. A method according to claim 1, wherein establishing said profile comprises fitting the model to match at least one local measurement of the flow parameter.

3. A method according to claim 2, comprising analyzing the flow so as to determine a mean value $H_w$ of the water holdup over the cross-section under consideration is determined on the basis of the profile.

4. A method according to claim 3, in which the model assumes a dimension $\lambda$ of the turbulent mixed layer on the axis, given by the equation:

$$\lambda = D/(k \cdot \sin \theta)$$

where k is a constant for a given diameter D.

5. A method according to claim 4, in which the model assumes a constant gradient for the variation of the water holdup $\alpha$ in the layer of mixture for a depth z as given by the equation:

$$\alpha(z) = \tfrac{1}{2} + (z_c - z)/\lambda$$

where $z_c$ is the position on the axis of the center of the layer of mixture.

6. A method according to claim 5, in which the model assumes that the water holdup a varies along the axis z'z in compliance with the equation:

$$\alpha(z) = 1 - \frac{k \cdot \sin\theta}{2shP} e^{2PZ} \text{ for } z < \min\{z_e, \tfrac{1}{2}D\}$$

where:
Z = z/D
X is a constant for a given diameter D
$P = \tfrac{1}{2}X \sin \theta/(1 - \alpha_m)$ where $\alpha_m$ is the mean value of $\alpha$ according to the profile
$z_e$ is defined by $a(z_c) = 0$
$\min\{z_e, \tfrac{1}{2}D\}$ is equal to $\tfrac{1}{2}D$, or $z_e$ if $z_e$ is less than $\tfrac{1}{2}D$; and
when $z_e$ is less than $\tfrac{1}{2}D$, the profile further includes a portion defined by:

$$a = 0 \text{ for } z_e < z < \tfrac{1}{2}D.$$

7. A method according to claim 1, wherein establishing said profile comprises fitting the model to match a measurement of a mean value of the profile in the cross-section under consideration.

8. A method according to claim 7, in which the model assumes a dimension $\lambda$ of the turbulent mixed layer on the axis, given by the equation:

$$\lambda = D/(k \cdot \sin \theta)$$

where k is a constant for a given diameter D.

9. A method according to claim 8, in which the model assumes a constant gradient for the variation of the water holdup $\alpha$ in the layer of mixture for a depth z as given by the equation:

$$\alpha(z) = \tfrac{1}{2} + (z_c - z)/\lambda$$

where $z_c$ is the position on the axis of the center of the layer of mixture.

10. A method according to claim 9, in which the model assumes that the water holdup a varies along the axis z'z in compliance with the equation:

$$\alpha(z) = 1 - \frac{k \cdot \sin\theta}{2shP} e^{2PZ} \text{ for } z < \min\{z_e, \tfrac{1}{2}D\}$$

where:
Z = z/D
X is a constant for a given diameter D
$P = \tfrac{1}{2}X \sin \theta/(1 - \alpha_m)$ where $\alpha_m$ is the mean value of $\alpha$ according to the profile
$z_e$ is defined by $a(z_c) = 0$
$\min\{z_e, \tfrac{1}{2}D\}$ is equal to $\tfrac{1}{2}D$, or $z_e$ if $z_e$ is less than $\tfrac{1}{2}D$; and
when $z_e$ is less than $\tfrac{1}{2}D$, the profile further includes a portion defined by:

$$a = 0 \text{ for } z_e < z < \tfrac{1}{2}D.$$

11. A method according to claim 1, wherein the step of measuring at least one parameter of the flow comprises measuring flow velocity, and wherein the step of establishing said profile comprises fitting a model to a measurement of the mean value of the velocity over the cross-section under consideration.

12. A method according to claim 1, wherein the step of measuring at least one parameter comprises measuring the holdup $\alpha$ in said flow.

13. A method according to claim 12, wherein measuring the holdup $\alpha$ comprises at least one local measurement of the holdup at said location in the well.

14. A method of analyzing an oil and water plane in an inclined well, comprising:
   a) measuring a parameter at a location in the well so as to determine a value representative of water holdup $\alpha$ in said flow;
   b) determining values of depth z, inclination $\theta$ and diameter D of the well at said location;
   c) establishing a profile for variation of water holdup along a diameter of the well lying in the vertical plane at said location using said value representative of water holdup, z, $\theta$ and D and by using a model that assumes a layer comprising a turbulent mixture of water and oil;

d) using said profile to analyze the flow.

15. A method according to claim 14, wherein the step of measuring at least one parameter comprises making a plurality of local water holdup measurements at said location.

16. A method according to claim 14, wherein the step of measuring at least one parameter comprises making a mean water holdup measurement at said location.

17. A method of analyzing an oil and water flow in an inclined well, comprising:

a) measuring at least one parameter at a location in the well so as to determine a value representative of velocity of the oil and water flow;

b) determining values of depth z, inclination $\theta$ and diameter D of the well at said location;

c) establishing a profile for variation of velocity along a diameter of the well lying in the vertical plane at said location using said value representative of velocity, z, $\theta$ and D and by using a model that assumes a layer comprising a turbulent mixture of water and oil;

d) using said profile to analyze the flow.

18. A method according to claim 17, wherein the step of measuring at least one parameter comprises making a plurality of local flow velocity measurements at said location.

19. A method according to claim 17, wherein the step of measuring at least one parameter comprises making a mean flow velocity measurement at said location.

* * * * *